United States Patent [19]
Clayton et al.

[11] Patent Number: 6,135,306
[45] Date of Patent: Oct. 24, 2000

[54] FUEL TANK ANTI-DEFLECTION DEVICE

[75] Inventors: Dan Clayton, Owosso, Mich.; Changize Sadr, North York; Timothy W. Chapman, Brampton, both of Canada

[73] Assignee: Salflex Polymers Inc., Weston, Canada

[21] Appl. No.: 09/245,726

[22] Filed: Feb. 8, 1999

[51] Int. Cl.$^7$ .................................................. B65D 1/42
[52] U.S. Cl. .................... 220/564; 220/562; 220/653; 220/501
[58] Field of Search .................... 220/562, 563, 220/564, 653, 651, 567.2, 592, 720, 732, 905, 529, 530, 501

[56] References Cited

U.S. PATENT DOCUMENTS

| | | | |
|---|---|---|---|
| 2,611,512 | 9/1952 | Fashay | 220/905 |
| 4,211,208 | 7/1980 | Lindner | 126/400 |
| 4,231,482 | 11/1980 | Bogan | 220/4.13 |
| 4,399,850 | 8/1983 | Schiemann | 220/653 |
| 5,813,566 | 9/1998 | Bradford et al. | 220/653 |

*Primary Examiner*—Stephen Castellano
*Attorney, Agent, or Firm*—McDermott, Will & Emery; Paul Devinsky

[57] ABSTRACT

A plastic fuel tank for use in a vehicle to carry gasoline, diesel fuel and the like has an upper wall, a lower wall and side walls. In order to inhibit relative deflection of the upper and lower wall toward each other, such as may occur when vacuum pressure is introduced into the tank by typical fuel sensor systems, the tank is equipped with a resilient columnar member extending between the upper and lower walls. The resilient columnar member thus limits deflection and changes in volume of the tank to not greater than one liter. The columnar member is hollow so as to not reduce the fuel capacity of the tank. The columnar member may be held in position by structural walls within the tank or by welding to either the top or bottom wall of the tank.

18 Claims, 3 Drawing Sheets

6,135,306

FUEL TANK ANTI-DEFLECTION DEVICE

FIELD OF THE INVENTION

This invention relates to fuel tanks of the type normally carried by vehicles having internal combustion engines. In particular, the device is particularly suited for use with fuel tank sensor systems which are used to monitor a fuel system comprising the tank and its various conduits.

BACKGROUND OF THE INVENTION

The fuel tank carried by automobiles is used to store hydrocarbon containing fuels such as gasoline or diesel fuel. The tank is a closed structure, and thus, is a structure which may conveniently be made out of polymeric materials, particularly materials which may be blow molded. The precise configuration of a fuel tank is normally quite complex. The designer desires to obtain as large a storage volume of fuel as possible while still having to fit the tank around various other components of the vehicle. Thus, the envelope for the tank may be quite complex in shape.

It is becoming far more common today to create such tanks from plastic materials. These include polyethylene and the like. One of the advantages of moldable, plastic fuel tanks as compared to steel fuel tanks is the ease with which complicated structures may be molded using such procedures as blow molding. Thus, it is becoming far more common to create fuel tanks of polymeric materials rather than steel.

Many vehicles comprise on-board fuel sensing and diagnostic equipment. Typically these systems function by creating a vacuum pressure in the interior of the tank. If there are leaks in any of the tank or any of its associated conduits, the sensor will detect that the vacuum pressure is not being properly resisted by the tank and its related components and will then send a signal to the vehicle operator indicating a malfunction in the fuel system.

It has been observed that one of the problems arising with many polymeric, molded fuel tanks is that some deflection will occur in the fuel tank. As the surfaces of the fuel tank deflect inwardly under the vacuum pressure, this effectively decreases the volume of the tank. As the volume of the tank is thus decreased by the inward deflection of the tank walls, a false "trouble" signal may be generated by the on-board sensing equipment. Thus, in order to be able to continue using the on-board sensing equipment commonly available, it is desirable that the deflection of the fuel tank be limited so as to inhibit substantial change of the volume of the enclosed space.

SUMMARY OF THE INVENTION

In accordance with the invention a fuel tank anti-deflection device for use with a fuel tank is provided. The fuel tank will have an upper surface, a lower surface and four side surfaces, the surfaces of the fuel tank comprising a closed volume for storage of liquid fuel. The anti-deflection device comprises a generally columnar member having a general axis. The columnar member comprises a first flange at a first end of the columnar member and a second flange at a second end of the columnar member. The columnar member comprises a resilient section, the resilient section biassing the first flange to move away relative to the second flange in the general direction along the axis of the columnar member. The anti-deflection device is generally hollow and comprises at least one aperture to permit liquid fuel to flow into and out of the anti-deflection device.

BRIEF DESCRIPTION OF THE FIGURES

A better understanding of the invention may be gained from reference to the following drawings which illustrate preferred embodiments of the invention and in which.

Figure 1:
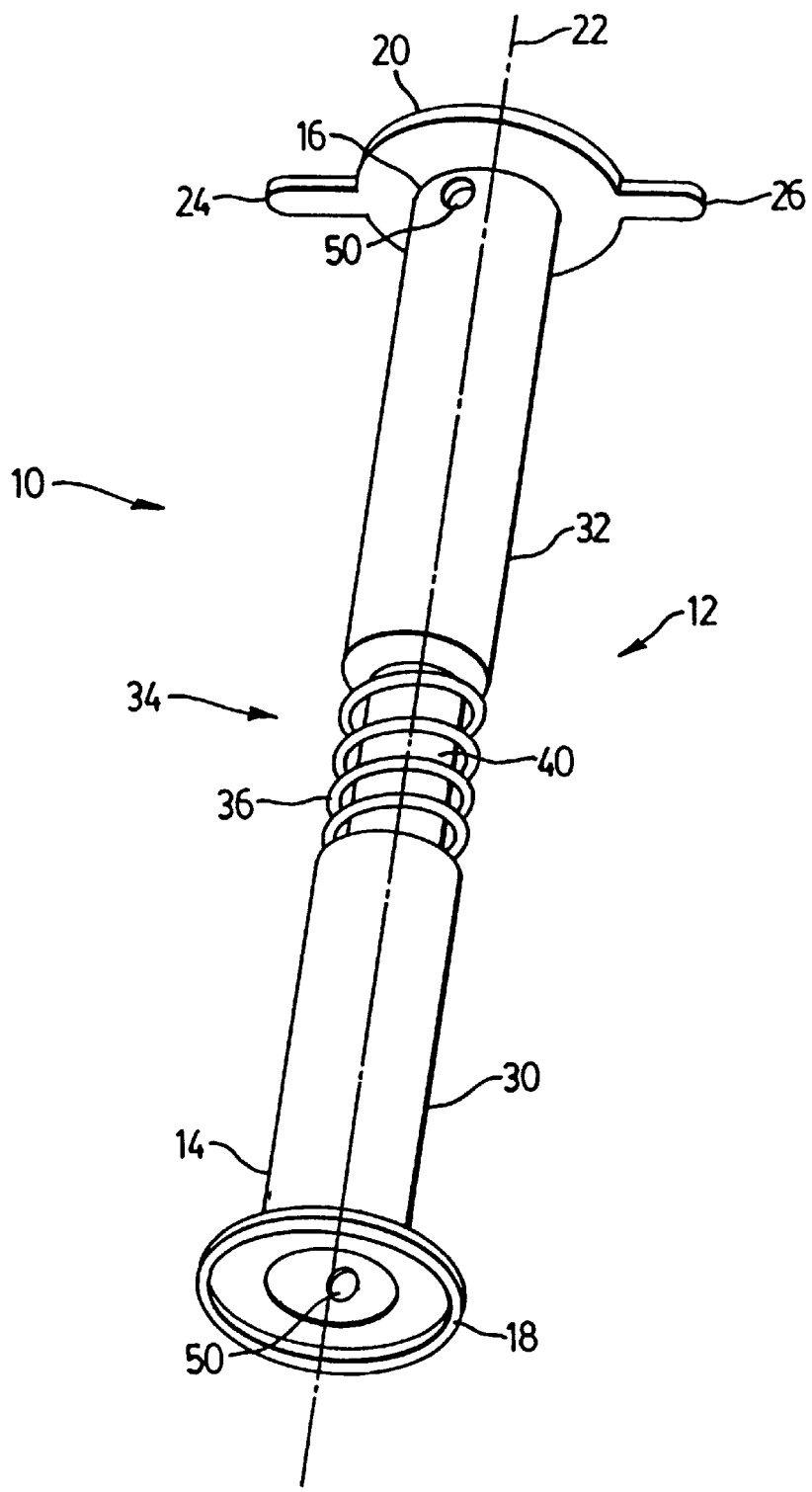
FIG. 1 illustrates a anti-deflection device in accordance with a first embodiment of the invention.

The device indicated generally at 10 in FIG. 1 comprises a generally columnar member 12. The generally columnar member 12 has a first end 14 and a second end 16 and a general axis 22. The anti-deflection device 10 comprises a first flange 18, adjacent first end 14 and a second flange 20, adjacent second end 16.

The columnar member 12 comprises a first generally fixed component 30 and a second generally fixed component 32. In addition, the columnar member 12 comprises a resilient section illustrated generally at 34. The resilient section 34 comprises a spiral spring 36. The second fixed component 32 comprises a piston like extension 40. The piston like extension 40 extends into an aperture (not shown) in the top of fixed component 30 to provide relative motion of component 32 relative to component 30 along the axis 22 of columnar member 12.

The piston-like extension 40 can be received in a snap retaining aperture at the top of component 30 so as to limit the outward movement of the component 32 relative to component 30 in the direction generally parallel to the axis 22. The spring 36 of resilient section 34 will bias the columnar member 12 to the expanded condition in which the first flange 18 is as far as possible from second flange 20. However, when compressive force is applied to the flanges 18 and 20, the spring 36 will deflect to permit a decrease in the overall length of the columnar member 12 as measured along the axis 22.

The columnar member 12 includes at least one aperture 50. In the embodiment illustrated in FIG. 1, the columnar member 12 comprises two such apertures 50. The columnar member 12 including its components 30, 32, the piston 40 and the resilient section 34 is hollow. The apertures 50 are located to enable fuel to flow into and out of the columnar member 12 for reasons which will be explained below.

As illustrated in FIG. 1, the second flange 20 comprises a pair of fingers 24 and 26 to assist in mounting the device 10 within a fuel tank.

Figure 2:
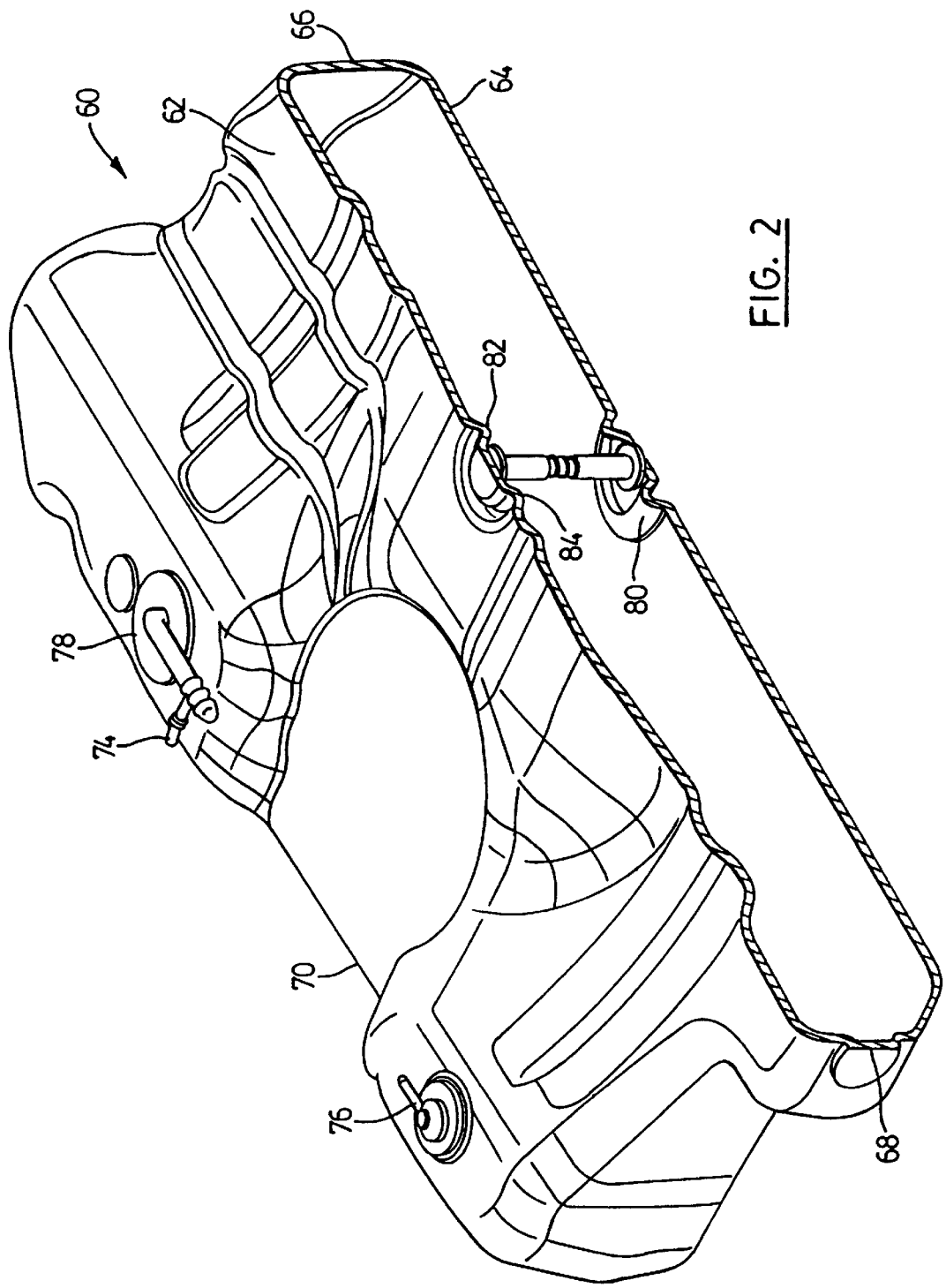
FIG. 2 illustrates the device of FIG. 1 installed in a fuel tank, the fuel tank being cut away to illustrate the device of FIG. 1.

FIG. 2 illustrates the device of FIG. 1 mounted in a fuel tank 60. The fuel tank 60 comprises a top wall 62, a bottom wall 64 and side walls 66, 68 and 70. A fourth side wall, not illustrated because of the cut away of the tank 60, would be generally opposite the side wall 70. While the term upper and lower wall has been applied to the walls 62 and 64, the directional nomenclature is for convenience only. The tank may be mounted with the walls 62, 64 in a substantially horizontal direction, or in a substantially vertical direction or anywhere in between as required by the vehicle layout. The walls 62 and 64, however, are considerably greater in extent than any of the side walls 66, 68, 70 and the fourth side wall opposite wall 70. Thus, when the tank is subjected to vacuum pressure, it is the walls 62 and 64 which will deflect far more than any deflection of the smaller side walls 66, 68 and 70.

Also, as shown in FIG. 2, the wall 62 is a very complex surface having a plurality of different curves and configurations. Typically, the configuration is dictated by the vehicle envelop into which the tank is to be installed.

The on-board sensors carried by many modern vehicles perform a test function of the tank and its many associated components. For illustration purposes, the components have not been illustrated in the drawing, although two pipe nipples 74 and 76 have been illustrated by way of example. The nipple 74 may be attached to a typical vehicle sensor which is mounted in the fuel tank through an aperture 78 made in the fuel tank for that purpose. The nipple 76 may be attached to a breather vent or roll over valve and may be located in another "dome" of the tank.

The anti-deflection device 10 as illustrated in FIG. 1 is installed in the tank 60 so as to limit deflection of the wall 62 toward the wall 64 when the tank is subjected to any negative pressure. In order to locate the most effective location of the anti-deflection valve, a finite element analysis is advantageously conducted of the wall 62 and the wall 64 to determine the area of greatest deflection. If the location of greatest deflection of the two surfaces is not substantially aligned perpendicular to the wall 64, the anti-deflection device 10 may be placed at the best compromise position. Alternatively, more than one anti-deflection device 10 can be installed in a tank as desired.

As illustrated in FIG. 2, the fuel tank 60 comprises retaining structure for retaining the anti-deflection device in place. The retaining structure is preferably located in one or more of walls 62 and 64. As shown, the wall 64 comprises an inwardly directed rib 80. The rib 80 may be formed during a blow molding process by a projection on the mold surface. The rib 80 is essentially in the form of an annular wall. If desired, the annular wall may be open at one or more locations to ensure that no significant amount of fuel is retained within the inner diameter of annular wall 80. The inner diameter of the annular wall 80 is larger than the greatest diameter of the first flange 18 of the anti-deflection device 10. The annular wall 80 thus serves to position the flange 18 so that when the anti-deflection device 10 is placed within the annular wall 80 the anti-deflection device cannot slide along the wall 64 and thus become dislocated.

The wall 62 comprises a similar rib 82 in the form of an annular wall. The inner diameter of the annular wall 82 is larger than the outer diameter of second flange 20 and serves to position the second flange 20 with respect to the wall 62. Advantageously, the annular wall 82 may include a narrow groove extending diametrically across the wall 82. One portion of such groove is illustrated in FIG. 2 at 84. The grooves 84 react with the fingers 24 and 26 of the flange 20 to permanently capture the flange 20 within the annular wall 82.

To install the anti-deflection device 10 of FIG. 1 as shown in FIG. 2, the anti-deflection device may be passed into the interior of the tank by inserting it through the aperture 78 into which ultimately the fuel sensor component will be located. In order to install the anti-deflection device, the diameter of the flange 18 and the flange 20 including fingers 24 and 26 is preferably less than the minimum diameter of the aperture 78. In this manner, the anti-deflection device 10 may be passed through the aperture 78 and passed horizontally along the tank until the flange 18 is adjacent the annular wall 80. At that time, the edge of the flange 18 may be placed within the inner diameter of the annular wall 80 with the axis 22 of the device 10 at an angle of approximately 45° to the plane of the wall 64. The anti-deflection device 10 is then collapsed down by moving component 32 toward flange 18 thereby collapsing the spring 36 and reducing the overall height of the anti-deflection device 10. The antideflection device 10 may then be moved so the axis 22 is substantially perpendicular to the wall 64. The component 32 is then released so that the anti-deflection device 10 may expand under the biassing force of the spring 36. The flange 20 will then move upwardly as shown in FIG. 2 until the fingers 24 and 26 engage within the snap fit of the groove 84 in the annular wall 82. The anti-deflection device 10 is then permanently mounted within the tank.

As an alternative, it may be that pressing inwardly on walls 68 and 66 will cause deflection of the walls 62 and 64 away from each other thereby increasing the spacing between the walls to enable positioning of flange 18 within annular wall 80 without collapsing spring 36. Then upon releasing the force on the side walls, wall 62 will return to its unstressed location with flange 20 captured within annular wall 82.

Once mounted as shown in FIG. 2, the anti-deflection device 10 provides structural support inhibiting relative motion of the wall 62 toward the wall 64 when vacuum pressure is applied to the tank. The amount of support will dependent upon the characteristics of the spring 36, a stronger spring providing greater resistance to deflection.

The spring 36 serves another function. Fuel tanks in vehicles are subject to a number of dynamic forces and must meet a number of structural tests to be acceptable for installation in a vehicle carrying gasoline in particular, and to a lesser extent, diesel fuel. The wall 62 could be supported relative to the wall 64 by any form of fixed columnar member including a rib or the like. However, it has been observed that a non-resilient support of the wall 62 relative to the wall 64 acts as a stress concentrator. One of the tests that fuel tanks must be subjected to for approval is a drop test. Installing rigid reinforcement between the walls 62 and 64 can lead to failure in the drop test as the shock load is passed directly through a non-flexible columnar or rib-like support to the adjacent mounting surface, and often produces failure such as cracking of the fuel tank at the mounting location. Thus, the spring 36 provides a shock absorbing effect which may be necessary in meeting fuel tank certification tests and the characteristics of the spring 36 are advantageously selected to provide the desired amount of anti-deflection support while still providing sufficient resilience to not cause stress concentration failure at the mounting location.

Similarly, to spread out the forces that may be involved in extreme circumstances or certification tests, the anti-deflection device 10 comprises enlarged flanges 18 and 20. The enlarged flanges 18 and 20 help to spread any impact forces over a slightly larger area than would be provided by the diameter of the fixed components 30 and 32. However, it is not necessary that the flanges 18 and 20 be larger in diameter than components 30 and 32, but this is preferred. The diameter of components 30 and 32 is also selected so that the columnar member 12 is relatively rigid in bending. It is desired that once the anti-deflection device 10 is mounted within the tank 60, the anti-deflection device will be permanently located. It would not be desirable for the anti-deflection device 10 to come loose from its mounting comprising the annular walls 80 and 82 as it would then be free to move about the tank where it would negatively impact other devices inserted into the tank such as the sensor, roll over valves fuel pump and the like, and might itself cause rupture of the tank. Thus, the columnar member 12 is of relatively significant diameter such that it is substantially rigid in bending. Thus, any change in the effective length of the anti-deflection device is accomplished only by deflection of the resilient section 34 and in particular by spring 36, not by any bending of the columnar member 12.

It is desired that the maximum amount of fuel be carried in the tank for the envelope available on the vehicle. Accordingly, it is preferable that the anti-deflection device 10 not take up any more fuel space than necessary for its intended function. Thus, the anti-deflection device is generally hollow. Liquid fuel in the tank may flow into and out of the apertures 50 so that the components 30, 32 and 34 may all contain fuel. Similarly, the flanges 18 and 20 are shown as generally cup-shaped and are also hollow permitting fuel to pass into the inside of these flanges. Thus, the amount of volume taken up in the tank by the anti-deflection device 10 is reduced to the minimum, being dictated only by the wall thickness of the various components required to provide appropriate strength. Advantageously, one of the apertures 50 is located adjacent the first flange 18 as low as possible on the anti-deflection device so that fuel may be drained from the anti-deflection device as the tank reaches its almost empty condition.

By way of example, a typical fuel tank may have an overall volume of 69 liters. Within industry norms, such tank may be considered to have a useable volume of 63 liters, the difference in overall volume and useable volume normally relates to the configuration of the tank and the fuel pick up location within the tank. Such a tank can have a volume decrease of as much as 2.9 liters arising from inward deflection of the major wall 62 and 64 under slight negative pressure as imposed by on-board sensing equipment. After installation of the anti-deflection device 10 as shown in FIG. 1, the volume decrease of the tank arising from deflection under typical vacuum pressure is 0.45 liters.

Figure 3:
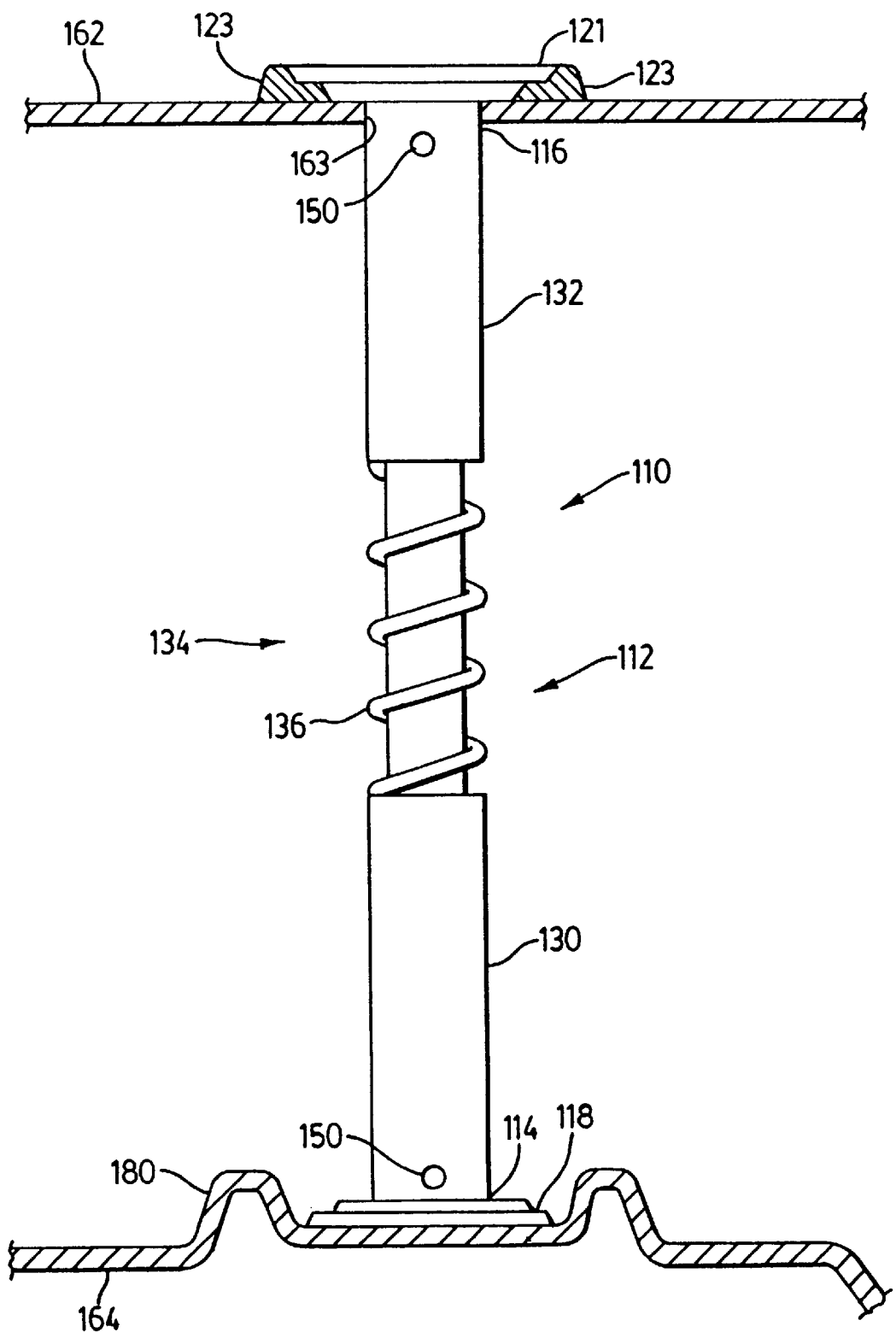
FIG. 3 illustrates an alternate embodiment of the device.

FIG. 2 illustrates an alternate embodiment of the antideflection device. The device 110 as shown in FIG. 3 has similar components comprising a columnar member 112 having a first end 114 and a second end 116. The device 110 comprises a first flange 118 located adjacent the first end 114. There is a flange 121 adjacent the second end 116. The columnar device includes a first component 130, a second component 132 and a resilient section 134. The resilient section 134 includes a spring 136. As shown in FIG. 3, the anti-deflection device 110 is mounted in a fuel tank. A portion of the lower wall 164 is shown including an annular wall 180 for positioning the anti-deflection device 110. The major difference between the embodiment shown in FIG. 1 and the embodiment shown in FIG. 3 is the connection of the second end 116 to the upper wall 162. In this case, the wall 162 comprises an aperture 163. In this case, the anti-deflection device 110 extends upwardly through the aperture 163 to the outside surface of wall 162. When installed in that location, the flange 121 may be slipped over the component 132 of the columnar member 112. The flange 121 is then welded to the tank wall 162 as shown at 123. Hence, the weld 123 may be essentially annular in configuration thereby sealing the aperture 163 and permanently positioning the anti-deflection device 110 with respect to the wall 162.

The embodiment illustrated in FIG. 2 thus provides a permanent mounting of the anti-deflection device 10. In this embodiment, the spring 136 of the resilient section 134 is not needed to maintain the device 110 in place. The device 110 will be maintained in place by the weld 123 and the interreaction of the flange 118 with the annular wall 180. However, the resilient section 134 and spring 136 are still required to provide the shock absorbing function referred to above.

Otherwise, the anti-deflection device 110 is similar to the anti-deflection device 10. Both devices are hollow and the anti-deflection device 110 comprises at least one aperture 150 to permit fluid flow into the interior volume of the anti-deflection device 110.

The anti-deflection device may be made from any suitable material which is adapted to be immersed in the fuel contained within the tank. This may include polyethylene or other materials. If made of polymeric materials the anti-deflection devices may be molded using known techniques such as injection molding or blow molding or the like. Where the anti-deflection device projects through the wall of the tank as shown in FIG. 3, it may be preferable to include a vapour barrier within the flange 121 to ensure that vapours contained within the columnar member 112 may not pass through the material of the flange 121 and/or the weld 123. Because the flange 121 is located outside the tank and is required to serve this sealing function, the flange 121 provides a vapour proof seal of the columnar member 112 adjacent the surface 162.

In the drawings, the anti-deflection device is maintained in position in the tanks by permanent welding of polymeric material or by interaction of the flanges with structure on the walls 62 and 64. Various other mounting structures will serve the intended purpose. The anti-deflection device may be welded at either or both flanges and the other permanent mounting techniques could be used such as threading the device and a suitable portion of the tank wall, heat staking and the like.

The resilient component of the anti-deflection device has been illustrated comprising a spring generally centrally located in the columnar member. The resilient section need not be centrally located. The resilience can be provided by means other than the coil spring as shown. Other types of springs may also be used. In addition, the required resilience can be provided by selection of suitable resilient materials and by selection of bendable resilient structures such as lattice work or other bendable components. All such variations are considered to be within the ambit of the present invention, the scope of which is defined by the following claims.

What is claimed is:

1. A vehicular fuel tank for storing fuel on board a vehicles, said fuel tank comprising an upper wall, a lower wall and side walls, said walls constituting a closed fuel storage chamber, and a resilient member located within said storage chamber and extending from said upper wall to said lower wall for resiliently inhibiting relative deflection of said upper and lower walls, said resilient member being continuously located in compression to thereby exert a force between said upper and lower walls, wherein said resilient member comprises a hollow column.

2. The fuel tank of claim 1 wherein said resilient member is permanently fixed within said chamber.

3. The fuel tank of claim 1 wherein said resilient member is adapted to exert a force between said upper and lower walls and said force is selected to prevent a diminution of the volume of said chamber greater than about one liter.

4. The fuel tank of claim 3 wherein said force is selected to prevent a diminution of the volume of said chamber greater than 0.5 liters.

5. A fuel tank assembly comprising a fuel tank having an upper wall, a lower wall and side walls, and an anti-deflection device comprising a generally columnar member having a general axis, said columnar member further comprising a first flange at a first end and a second flange at a second end and a resilient section, said resilient section biasing said first flange to move away from said second flange in the direction of said axis, said first flange being located adjacent said lower wall and said second flange being located adjacent said upper wall, said fuel tank further comprising a retaining structure for retaining said anti-deflection device in place, wherein said retaining structure comprising at least one rib.

6. The fuel tank assembly of claim 5 wherein said resilient section includes a spring.

7. The fuel tank assembly of claim 5 wherein said lower wall comprises said at least one rib, and said rib in the form of an annular wall.

8. The assembly of claim 7 wherein said first flange of said anti-deflection device is adapted to be received within said annular wall of said lower wall.

9. The fuel tank assembly of claim 5 wherein said rib of said retaining structure comprises an annular wall.

10. The assembly of claim 9 wherein said second flange is adapted to be received within said annular wall of said upper wall.

11. The assembly of claim 10 wherein said annular wall comprises at least one slot and said second flange comprises at least one finger adapted to be retainably received within said at least one slot.

12. A fuel tank assembly comprising a fuel tank having an upper wall, lower wall, and side walls, said walls constituting a closed fuel storage chamber, and an anti-deflection device located within said chamber and extending from said upper wall to said lower wall said anti-deflection device comprising a generally hollow columnar member having a general axis and first and second ends, said columnar member comprising a first flange at said first end and a second flange at said second end and further including a resilient section, said resilient section biasing said first flange to move away from said second flange in the general direction of said axis, said first flange being located adjacent said lower wall and said second flange being located adjacent said upper wall, said fuel tank assembly further comprising a retaining structure for retaining said anti-deflection device in place.

13. The fuel tank assembly of claim 12 wherein said generally hollow columnar member comprises at least one aperture to permit liquid fuel to flow into and out of said columnar member.

14. The fuel tank assembly of claim 13 wherein said at least one aperture is adjacent said first flange.

15. The fuel tank assembly of claim 12 wherein said retaining structure comprises at least one weld.

16. The assembly of claim 15 wherein said tank comprises an aperture and said columnar member extends to said aperture, and at least one of said first and second flangers is attached to said columnar member and to said tank.

17. The assembly of claim 16 wherein said aperture is included in said upper wall.

18. The assembly of claim 17 wherein said flange is welded to said upper wall.

* * * * *

UNITED STATES PATENT AND TRADEMARK OFFICE
CERTIFICATE OF CORRECTION

PATENT NO.   : 6,135,306
DATED        : October 24, 2000
INVENTOR(S)  : Dan CLAYTON, et al.

It is certified that error appears in the above-identified patent and that said Letter Patent is hereby corrected as shown below:

In the Claims:

(1) Column 6, Claim 1, Line 42, in the word "vehicles" delete the --s--.

(2) Column 6, Claim 1, Line 48, change "located" to --loaded--.

(3) Column 7, Claim 5, Line 5, change "comprising" to --comprises--.

(4) Column 7, Claim 7, Line 9, after "rib" insert --is--.

(5) Column 8, Claim 16, Line 21, change "flangers" to --flanges--.

Signed and Sealed this

Eighth Day of May, 2001

*Attest:*

NICHOLAS P. GODICI

*Attesting Officer*    *Acting Director of the United States Patent and Trademark Office*